United States Patent
Tuan

(10) Patent No.: US 8,234,869 B2
(45) Date of Patent: Aug. 7, 2012

(54) AVIATION ENGINE INLET WITH TANGENTIAL BLOWING FOR BUZZ SAW NOISE CONTROL

(75) Inventor: Yen Tuan, Kirkland, WA (US)

(73) Assignees: Yen Tuan, Kirkland, WA (US); Michael Tuan, Kirkland, WA (US); Sophia Tuan, Kirkland, WA (US)

( * ) Notice: Subject to any disclaimer, the term of this patent is extended or adjusted under 35 U.S.C. 154(b) by 0 days.

(21) Appl. No.: 13/135,518

(22) Filed: Jul. 8, 2011

(65) Prior Publication Data

US 2012/0031501 A1    Feb. 9, 2012

(51) Int. Cl.
*F02C 7/24* (2006.01)
*F02K 1/82* (2006.01)

(52) U.S. Cl. ............................................ 60/725; 181/213

(58) Field of Classification Search ............... 60/226.1, 60/725, 782, 785, 795; 244/1 N, 53 B, 134 R; 415/173.1, 173.3, 173.4; 181/210, 211, 212, 181/213, 214; 137/15.1, 15.2
See application file for complete search history.

(56) References Cited

U.S. PATENT DOCUMENTS

| 3,446,223 | A | * | 5/1969 | Hancock | 137/15.2 |
| 3,821,999 | A | * | 7/1974 | Guess et al. | 181/296 |
| 4,132,240 | A | * | 1/1979 | Frantz | 137/15.1 |
| 5,707,206 | A | * | 1/1998 | Goto et al. | 415/173.1 |
| 5,721,402 | A | * | 2/1998 | Parente | 181/214 |
| 6,375,118 | B1 | * | 4/2002 | Kibens et al. | 244/53 R |
| 7,870,721 | B2 | * | 1/2011 | Winter et al. | 60/226.1 |
| 7,967,105 | B2 | * | 6/2011 | Tuan | 181/214 |
| 2005/0060982 | A1 | * | 3/2005 | Mani et al. | 60/226.1 |

* cited by examiner

*Primary Examiner* — William H Rodriguez
*Assistant Examiner* — Gerald Sung

(57) ABSTRACT

Buzz saw noise propagates through inlet of aviation engine at high power settings. An inlet of aviation engine with blowing slot blowing air grazing over surface of buzz saw lining at speeds higher than inlet mean air flow speed for buzz saw noise control.

21 Claims, 15 Drawing Sheets

Inlet Layout

Inlet Layout

Annular Blowing Slot (Height Exaggerated)

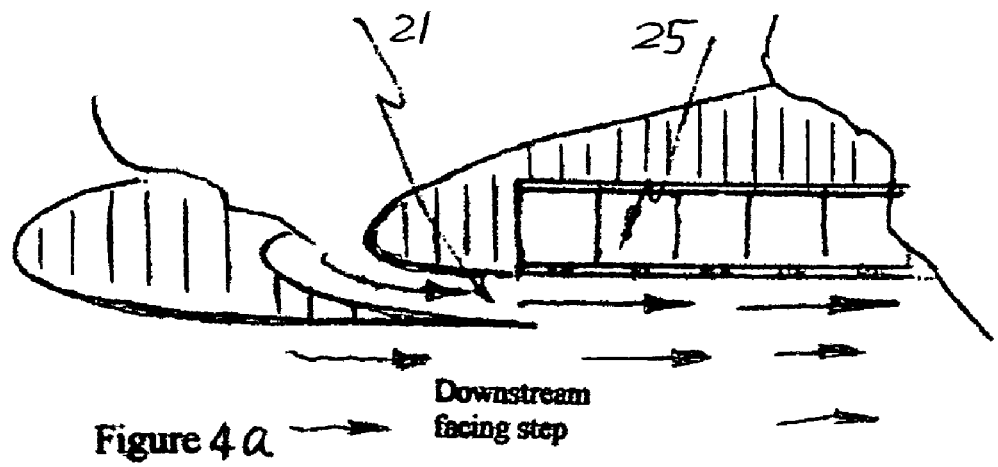
Figure 4 a — Downstream facing step
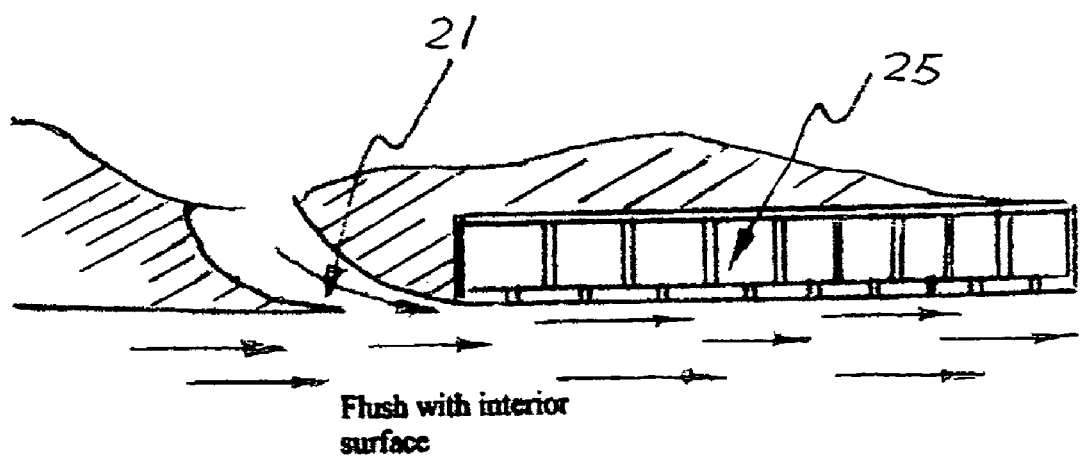
Flush with interior surface
Figure 4 b

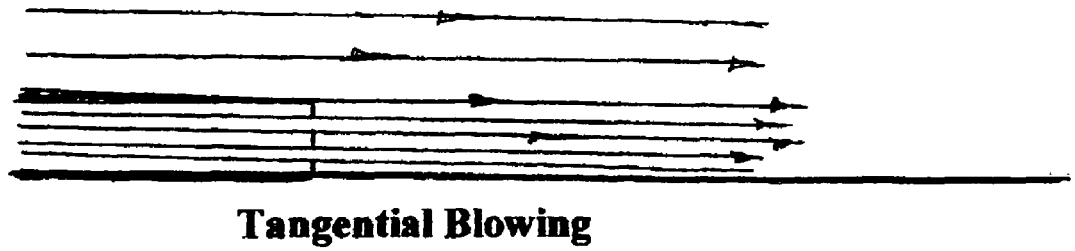
Tangential Blowing
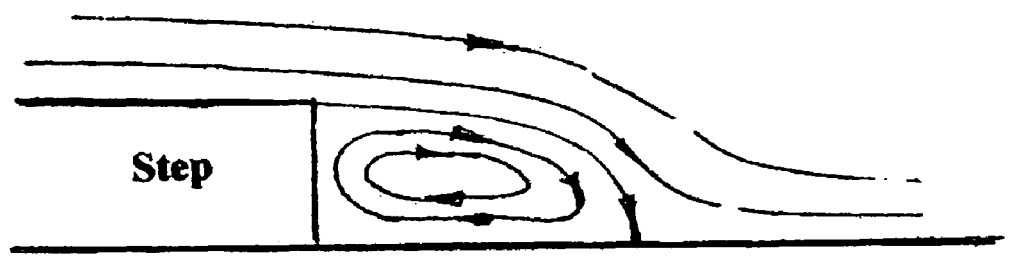
Step
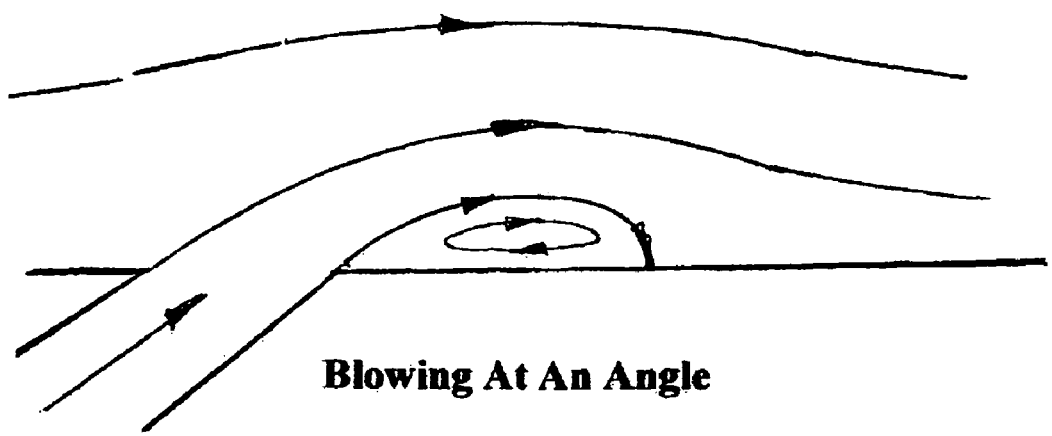
Blowing At An Angle
Fig. 6

Back Plate
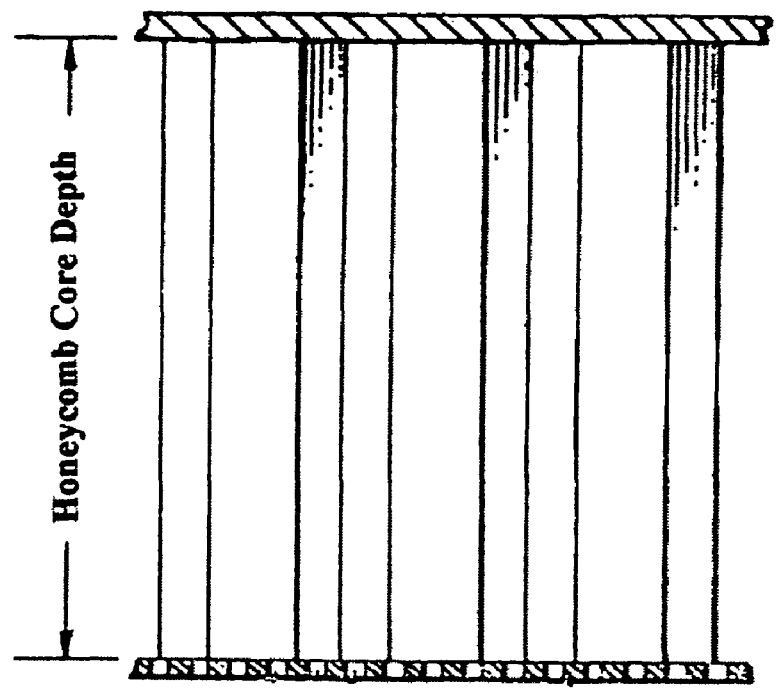
Perforated Face Sheet
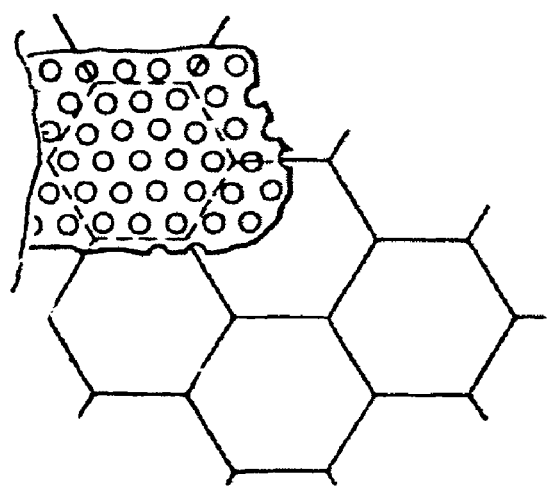
Honeycomb Core
Fig. 10

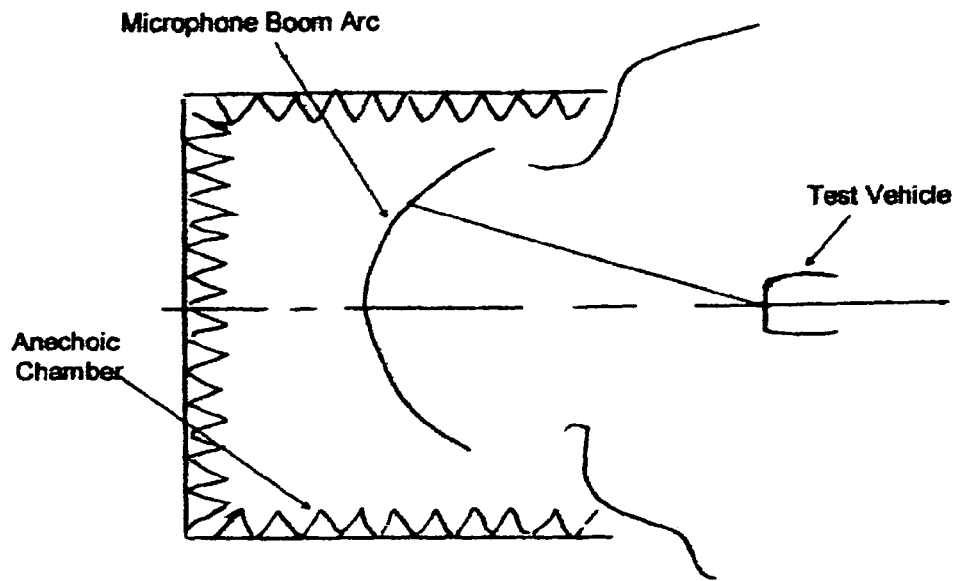
Aggressive Noise Abatement
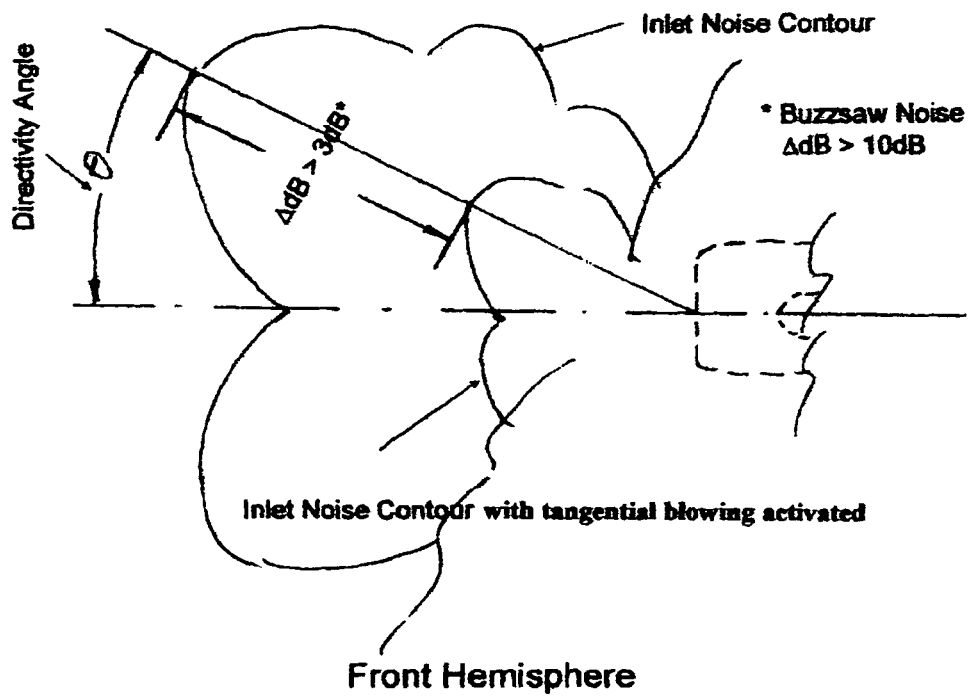
Front Hemisphere
Fig. 14

AVIATION ENGINE INLET WITH TANGENTIAL BLOWING FOR BUZZ SAW NOISE CONTROL

BACKGROUND OF THE INVENTION

Buzz saw noise was discovered by aviation industry in the 1960's when the high bypass ratio fan engine was first used to power the jumbo jet aircraft. Buzz saw noise was generated when the high bypass ratio fan engine was run at take-off and max-cruise powers. The noise propagated through the engine inlet sounded like that of a buzz saw hard at work in the woods falling timbers. Noise engineers and technicians, the present inventor was one of them, coined this fluttering noise the buzz saw noise.

Paris air show would be the occasion and place to display the brand new jumbo jet 747 and that was the intention of the Boeing management. The new 747 jumbo jet engine JT9D, however, was experiencing fan stall and engine surge at high power settings; whether it was safe to fly over the ocean to Paris was the concern. Boeing management would like to witness in person how the engine operates before signing off the maiden flight trip; in doing so, they heard this funny engine noise at take-off power as if the fan blades are about to fly apart. "We need to fix It.", was the comment. Noise research engineers asked the technicians on the test site. "what does this funny noise sounds like? "Sort of like a buzz saw."

From ⅓-octave band noise spectrum analyses, the funny noise spectrum displayed high amplitude low frequency broadband noise, which was absent for low engine power settings. It was not evident that this noise was from the engine inlet, and it could be that the jet noise spilled over into the front hemisphere. But jet noise does not have this funny flutter characteristic.

Subsequent digital narrow band spectral analyses using the newly developed FFT (fast Fourier transform) technique render that the spectrum content of this funny engine noise consists of a multitude of tones at multiple of fan shaft frequency; and hence an alternative name of this funny engine noise was multiple pure tone noise.

At high power settings, the fan rotor blade tip of the high by-pass ratio fan engine rotates at transonic speeds. Aerodynamically, at this transonic speed, a fan blade leading edge shock system emerges, and this funny engine noise could be associated with this shock system. Shock is essentially a non-linear phenomenon, linear acoustic treatment of the shock associated noise is an over simplification.

Buzz saw noise control problem is a tall order and is not to be considered a simple task. Instead of a single blade passing frequency tone, there are many (say, 20 or 30) buzz saw tones waiting to be attenuated. The daunting task of controlling a multitude of buzz saw tones often precipitates a tendency of circumventing the control problem toward a psycho-acoustic opaque impression that these low frequency tones might be less troubling. Apparently, existing technique of inlet peripheral lining application is not adequate to deal with so many buzz saw tones. Adaptive control, wave cancellation techniques to deal with so many tones appear also hopeless.

Tangential blowing, otherwise known as wall jet, is a branch of viscous aerodynamics, which serves to inject a layer of grazing flow along a surface to control the complications of flows over the surface, such as excessive boundary layer development or flow separation.

In addition to the classical boundary layer flow control, we aim to introduce tangential blowing to improve buss saw noise attenuation performance of the buzz saw lining for community noise control and air craft cabin noise reduction.

Relevant technology landscape of the inlet invention includes the following areas:
Buzz saw lining,
Tangential blowing,
Quiet air supply system,
Parasitic recirculation flow from fan bleed or compressor bleed,
Inlet and nacelle for minimum cruise drag and reduction of trip fuel consumption,
Inlet/engine integration technology,
Fan tip flow energization,
Cabin noise control at cruise condition.
The references at the end of this disclosure show some of the recent works by the aviation industry.

BRIEF SUMMARY OF THE INVENTION

The present patent application entitled "Aviation Engine Inlet with Tangential Blowing for Buzz Saw Noise Control" deals with the control and attenuation of buzz saw noise (tones) generated by high by-pass ration fan engine that propagates through the engine inlet and impresses upon airport communities and aircraft cabins.

The patent specification herein, comprises several embodiments of inlets constructed to control buzz saw noise. The disclosure herein describes these embodiments for aviation industry application and the high lights of the innovative steps including technology discoveries and unexpected experimental findings addressing the merits of the present invention and in turn substantiating the acute scope of the present patent claims.

ADVANTAGE

Aviation industry's practice dealing with the control of buzz saw noise (tones) in the past 40 years has been using peripheral acoustic lining on the inlet interior wall to attenuate the buzz saw noise as it propagates through the inlet. The effectiveness of the peripheral acoustic lining is arguably limited in the attenuation of so many buzz saw tones. There has no innovation in the foreseeable future that would significantly improve the acoustic lining performance.

The present invention using tangential blowing airflow over the surface of the peripheral acoustic lining enables drastic attenuation performance improvement of the peripheral acoustic lining, as far as buzz saw tones are concerned.

Unexpected experimental results have demonstrated the robustness of the concept of tangential blowing airflow over the acoustic lining surface that all of the significant buzz saw tones are eliminated.

BRIEF DESCRIPTION OF THE DRAWINGS

There are 15 Figures.

FIGS. 4a and 4b show the lips of the tangential blowing slot.

FIG. 6 shows 3 flow patterns.

FIG. 10 shows a perforated-face-sheet-honeycomb-core-back-plate lining construction.

FIG. 14 shows a model inlet test layout and typical frontal hemisphere noise pattern.

DETAILED DESCRIPTION OF THE INVENTION

In this disclosure is the embodiment of a class of inlets for aviation engine application. Aviation engine inlets are tubular in shape, which include an inlet lip surface, an inlet interior surface and an inlet exterior surface. The inlet exterior surface is an integral part or the nacelle cowling. The unique feature of this class of inlets is a tangential blowing slot, which is located immediately upstream from a segment of a buzz saw lining having an exposed surface defining a portion of the interior surface of the inlet. The lining is in turn connected to the fan casing at the engine fan face. See FIG. 1. The function of this class of inlets is to increase the buzz saw noise attenuation performance of the lining. The mechanical features and the function and performance of this class of inlets are disclosed in the following, and from which the claims are made.

Figure 1:
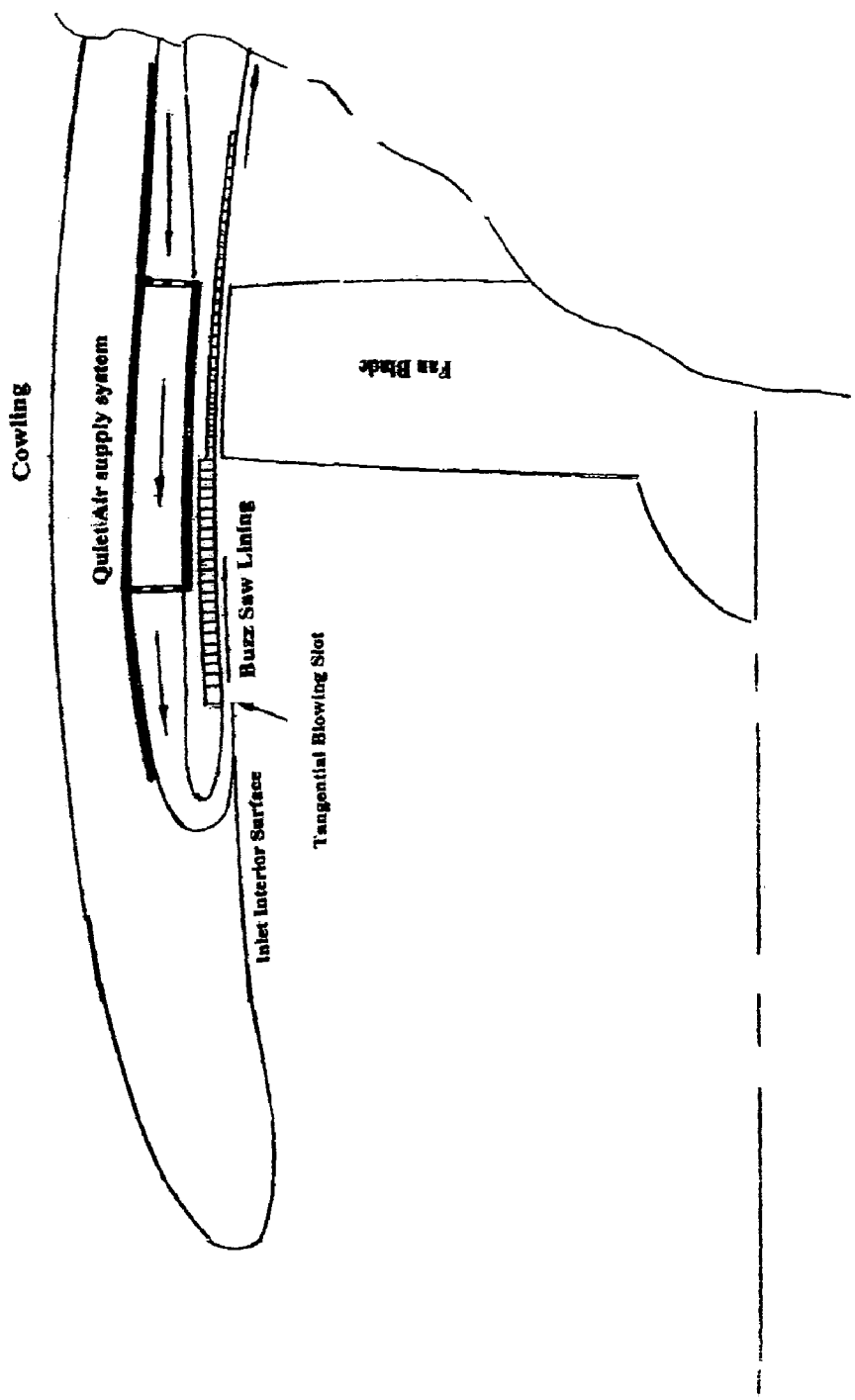
FIG. 1 shows an embodiment of a simple inlet including a tangential blowing slot and a buzz saw lining, a quiet air supply system which is disclosed in a provisional patent application No. 61/401,135, Filing date Aug. 9, 2010.

A simplest configuration of an air worthy inlet invention layout including the above elements and including a quiet air supply system is shown in FIG. 1 (see the reference provisional patent application, No. 61/401,135, filing date Aug. 9, 2010). The quiet air supply system in FIG. 1 is compacted and streamlined for airworthiness of the inlet application and otherwise has all the main feathers shown in FIG. 2. The tangential blowing airflow source is intentionally not specified in FIG. 1.

Figure 2:
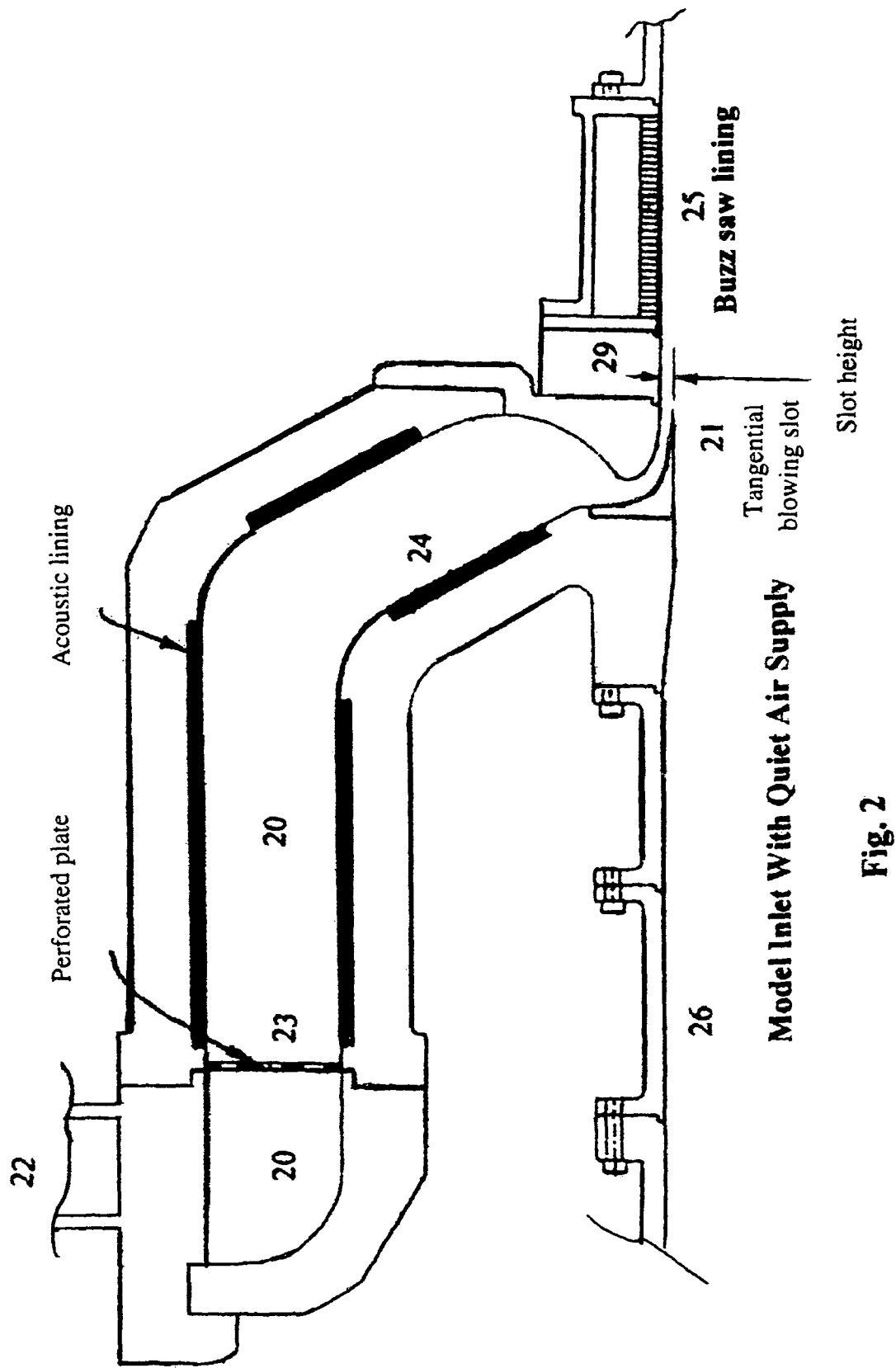
FIG. 2 shows a model inlet for research and development.

A research and development model inlet was built and tested. The main parts of the model inlet test vehicle is shown in FIG. 2 comprising; a tangential blowing slot, 21, a segment of a buzz saw lining, 25, a removable inlet section, 29, and an inlet interior surface, 26. A quiet air supply system includes a quiet settling chamber, 20, acoustic treatment, 24, a perforated plate, 23, inflow ducts 22. Two heights of the tangential blowing slot are also indicated. The quiet air supply system is over sized.

Figure 3:
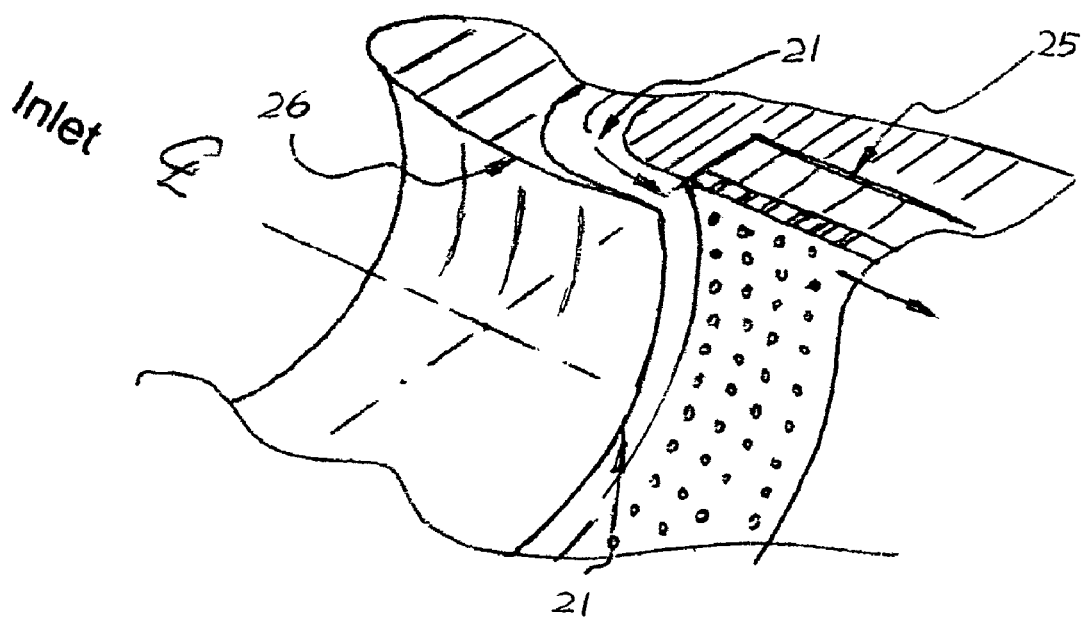
FIG. 3 shows a prospective drawing of a tangential blowing slot.

The tangential blowing slot 21 is annular (FIG. 3) extending axial symmetrically 360 degrees in the circumferential direction all the way around the inlet axis; it has a slot lip in the shape of a downstream facing step (FIG. 4*a*). It can also be flush with the inlet interior surface (FIG. 4*b*). The tangential blowing slot, otherwise known as a wall jet slot, is to deliver a stream of blowing airflow grazing along, that is tangent to, in the present case, a buzz saw lining surface (FIG. 2 and FIG. 3; 21, 25). The buzz saw lining is of a perforated-face-sheet-honeycomb-core-back-plate construction (FIG. 10). An effective way of delivery a grazing (tangential) flow is for the blowing slot showing in FIGS. 1,2 and 3, to have a slot lip in the shape of a down stream facing step.

In this disclosure, the terms, blowing slot or tangential blowing slot, stands for annular tangential blowing slot which extends axial symmetrically 360 degrees in the circumferential direction all the way around the inlet axis with a slot lip in the shape of a downstream facing step (FIG. 3 and FIG. 4*a*, 21). The tangential blowing slot can be unwrapped to form a two-dimensional tangential blowing slot, which was used in the past research on tangential blowing.

Figure 5:
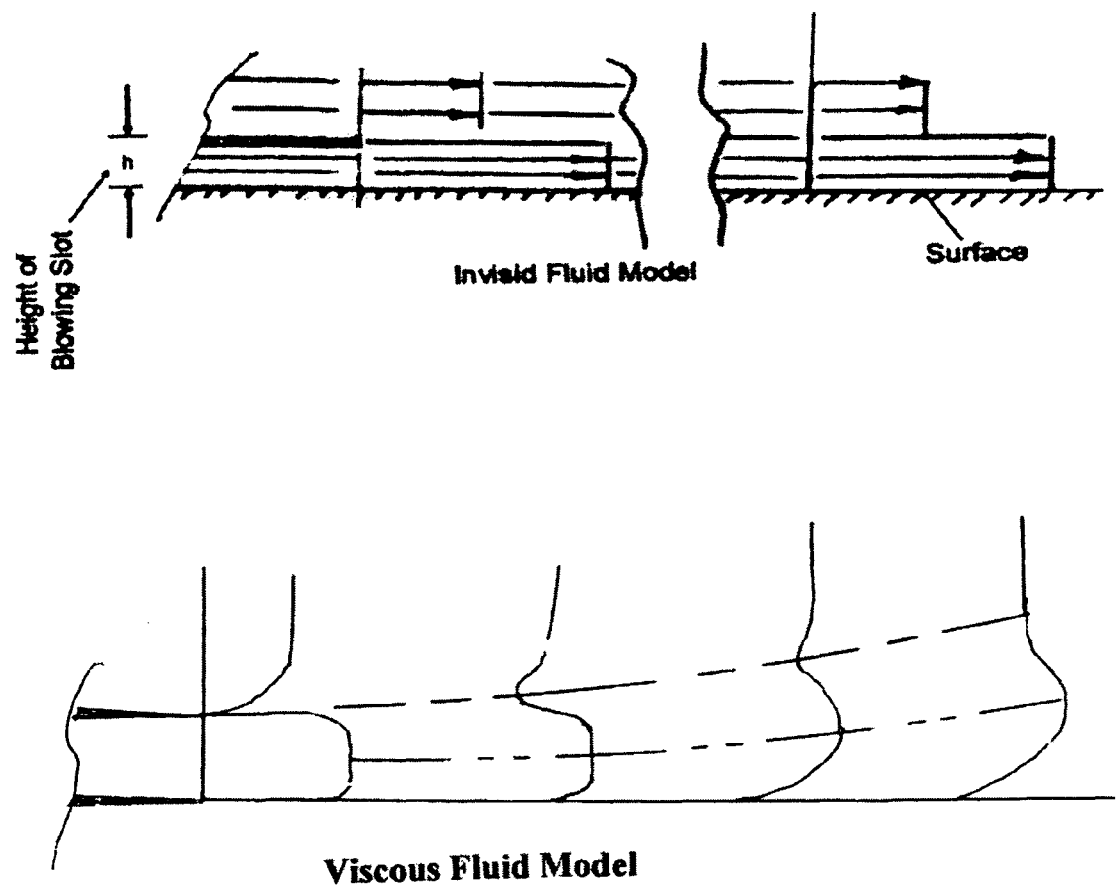
FIG. 5 shows non-viscous and viscous flows of the tangential blowing slot.

An inviscid two-dimensional tangential flow (wall jet) situation is shown in FIG. 5. When air viscosity or turbulence is involved, the flow situation is complex (see the reference literatures). The flow exiting the lip near the surface develops over the surface a new boundary layer that is very thin and very healthy. The other side of the sheet of blowing flow mixes with the external flow that has a tired and thick boundary layer. The mixing is in the shape of a wake with a pronounced wake trough. This wake decays downstream and eventually forms an inverted boundary layer.

This tangential blowing flow, or grazing flow, is important, as it creates, in the present application (FIGS. 1,2, 3, 4), a grazing flow field without local separation bubble downstream over the acoustic lining surface, causing, in general, an increase in the noise attenuation performance of the acoustic lining, and in particular, a large increase in the buzz saw noise attenuation performance of the buzz saw lining.

Instead of using a blowing slot with a downstream facing lip, a solid downstream facing step was also used and tested (FIG. 6). The solid downstream facing step (simply, step) is to trigger an inlet interior surface boundary layer flow separation and reattachment, which would result in an ultra thick boundary layer downstream from the reattachment point, as if the inlet interior surface or the acoustic lining surface, as the case may be, were subject to an ultra thick boundary layer. Test results show that the flow separation bubble and the ultra thick boundary layer cause an increase in the level of fan broadband noise that is generated by fan rotor blade tip and a decrease in the noise attenuation performance of an acoustic lining. It is then surmised that the tangential blowing flow that avoids the flow separation bubble, reduces the boundary layer thickness and creates an inverted boundary layer (the equivalent of creating a negative boundary thickness), would progressively reduce the fan broadband noise level and increase the noise attenuation performance of acoustic lining.

Further yet, the solid step-triggered boundary layer separation and reattachment (a local separation bubble with recirculation flow) is aerodynamically equivalent to that caused by a boundary layer blowing flow at an angle with respect to the surface (FIG. 6). Therefore, a blowing flow at a zero degree angle with respect to the surface (a grazing flow), i.e. in a "tangential direction" can avoid the separation and reattachment, and hence can create an inverted boundary layer. The "tangential blowing" otherwise known as "wall jet injecting" would have the best potential for improvement of inlet noise abatement.

Figure 7:
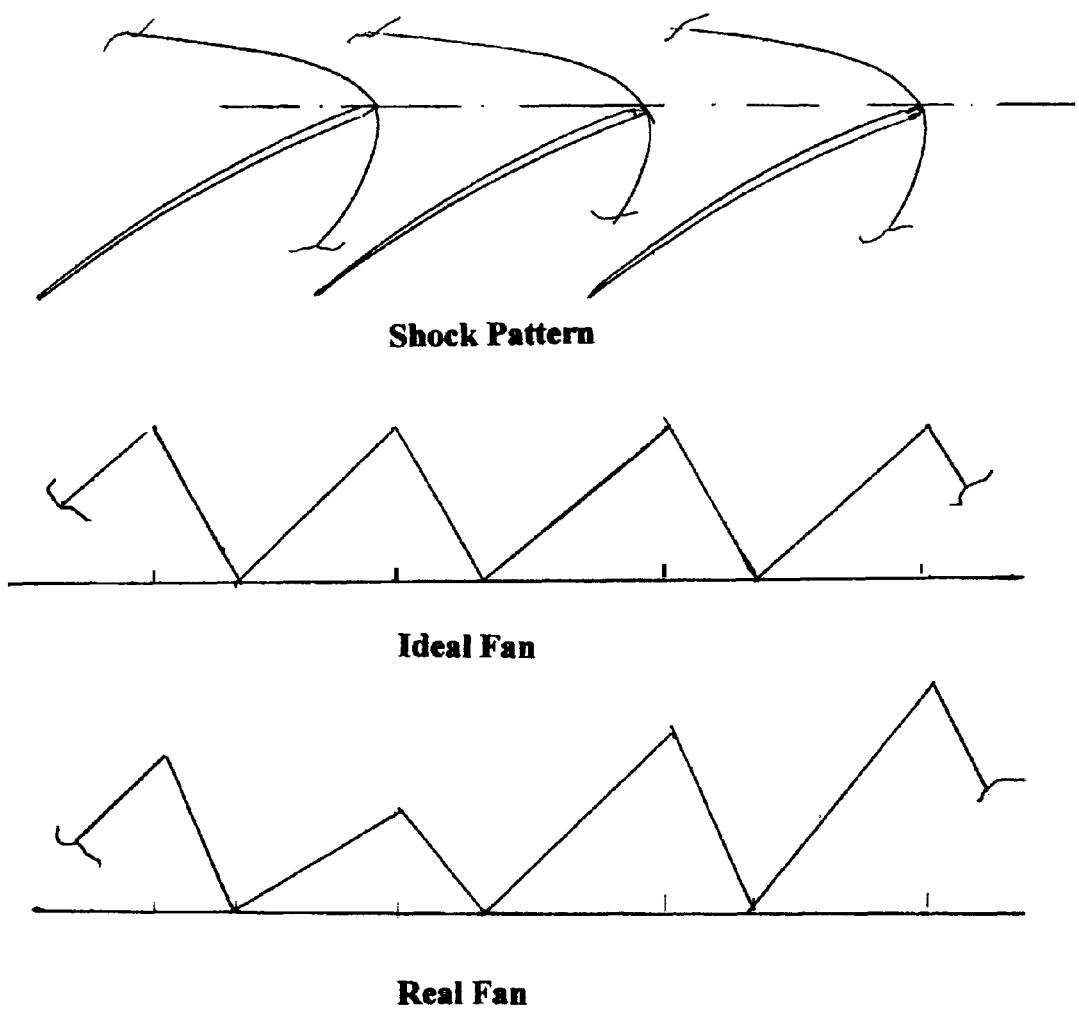
FIG. 7 shows shock patterns of an ideal fan and a real fan.

When an isolated airfoil travels at a slight supersonic speed (transonic speed), two oblique shock waves begin to emerge at the leading edge of the airfoil (FIG. 7). The respective strengths of the shock waves depend on the angle of attack of the airfoil leading edge. Aviation engine fan rotor rotating at transonic speed can be visualized as a stack of individual airfoils wrapped around the engine axis. The systems of oblique shock waves, which are attached to the leading edge of each fan rotor blade, rotate with the fan rotor blades. This fan rotor "locked" rotating system of shock waves generates buzz saw noise.

Transonic fan rotor blade leading edge shock patterns are very localized confining only within a fraction of fan blade chord length in front of the fan rotor face. See FIG. 7. Pressure measurements on the fan rotor casing indicated a time trace of saw-tooth shaped pressure variations.

In a geometrically perfect fan where the blades are identical and the staggering of the blades are perfect the saw teeth are identical. A real fan, with imperfection, however small, the saw teeth would be different. Frequency analyses of the pressure trace of a real fan would yield pressure harmonics at multiple integer rotor shaft frequencies-buzz saw tone frequencies.

Figure 8:
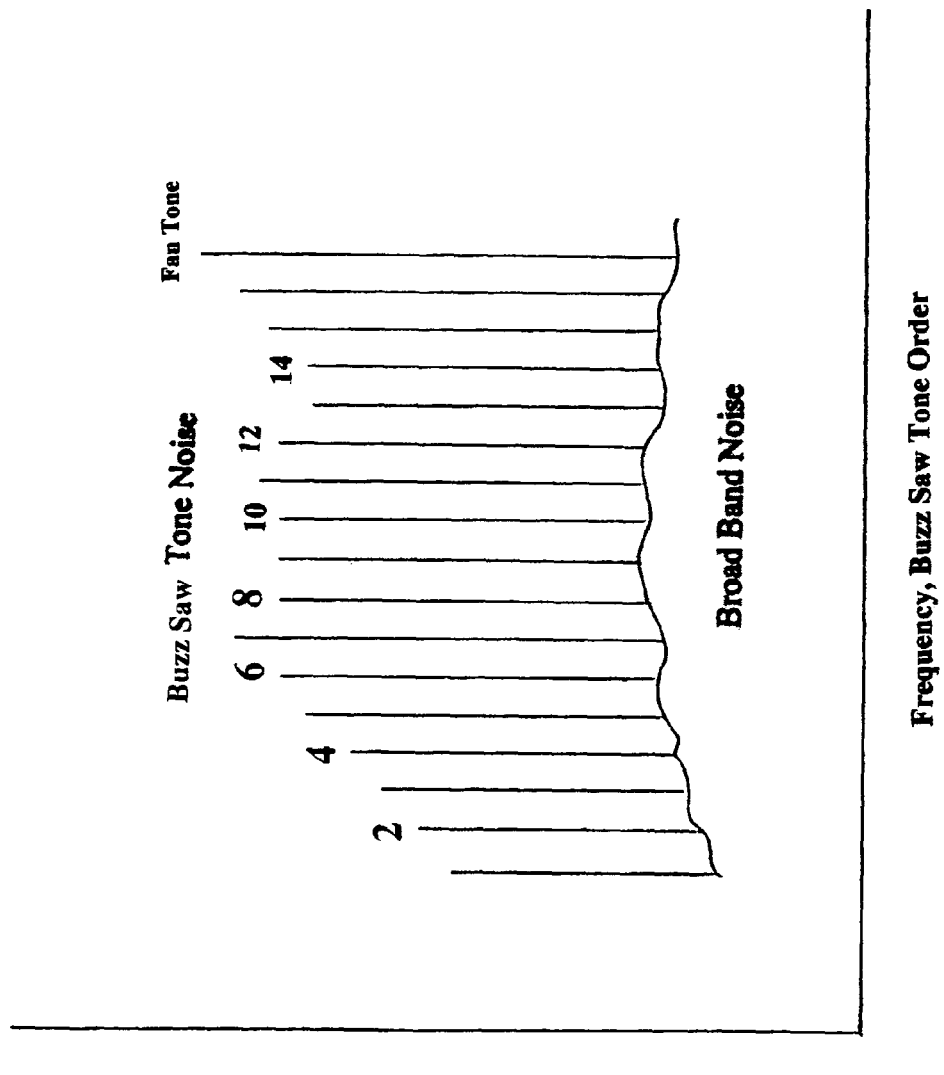
FIG. 8 shows buzz saw tone orders, the sound pressure level is expressed in decibel, dB.

Buzz saw tone frequencies are at multiples of rotating frequency of the fan. The buzz saw tone order n is the multiplicity, the integer number n, of fan revolution. For example, the frequency of buzz saw tone order n is n times the revolution per second of the fan rotation. A typical buzz saw noise frequency spectrum of a fan with 17 blades is shown in FIG. 8.

For each of the buzz saw tone order, there is a dominating circumferential mode. This dominating circumferential mode is absent in fan tone noise at low speed. Therefore to name buzz saw tones as "multiple pure tone" misses this dominating circumferential mode.

For large modern aviation engine fans, say 10 feet fan diameter, the transonic fan would be running at 40 revolutions per second. The frequencies of buzz saw tone orders are at multiples of increment of 40 cps. The buzz saw tones are getting crowded on the buzz saw tone frequency spectrum. For a fan of 32 blades, the fan tone is at a frequency of 1280 hertz, which is the frequency of buzz saw tone order 32. The first harmonic of the fan tone is at a frequency of 2560 hertz, the same frequency of buzz saw tone order 64. These frequencies are all within the audio frequency range (for example, music note C at 520 hertz). Thus, we have to deal with 64 buzz saw tones in the noise control of a large fan engine.

Figure 9:
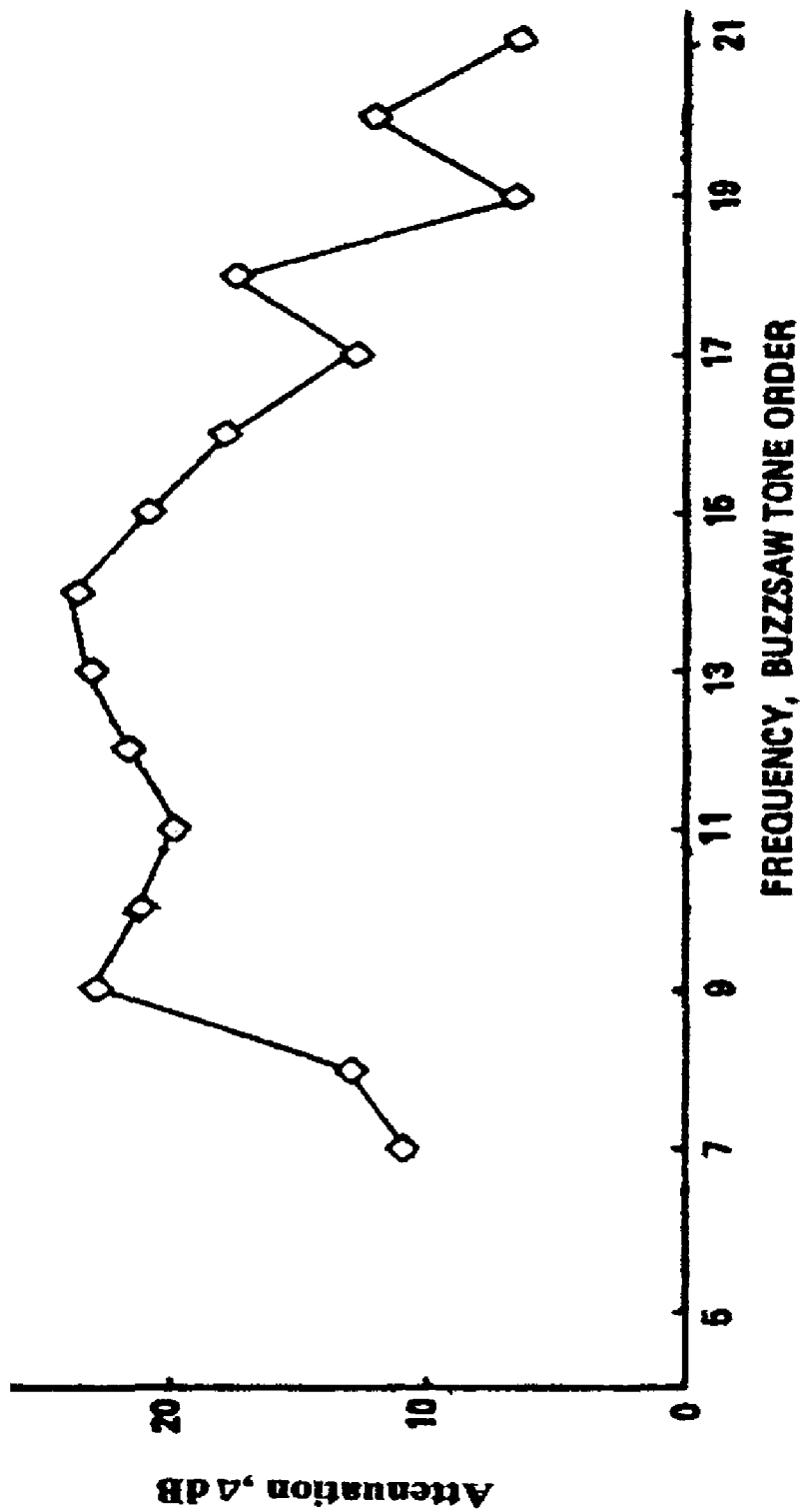
FIG. 9 shows an attenuation spectrum of buzz saw tones with tangential blowing flow.

The robustness of the concept of tangential blowing in the improvement of the attenuation of buzz saw tones of the buzz saw lining is in its capacity in dealing with the attenuation of so many buzz saw tones at hand. A typical attenuation frequency spectrum of a buzz saw lining using tangential blowing is shown in FIG. 9. The model inlet test results in FIG. 9 indicate that 99 percent of the buzz saw noise power in the front hemisphere has been removed. See the model inlet test layout in FIG. 14.

On account that the fan blade leading edge shock structure is confined within a small distance in front of the fan rotor face, the position of the buzz saw lining should be immediately in front of the fan face (FIGS. 1).

The shock pressure variations are of the order of psi. These large pressure variations call for a large-percentage-open-area perforated face sheet of a buzz saw lining with a perforated-sheet-honeycomb-core-back-plate-lining construction (FIG. 10). The honeycomb core depth should be tuned at the frequency of the middle tone order of the buzz saw tones that are to be attenuated.

A typical layout of an air worthy aviation engine inlet with tangential blowing for buzz saw noise control is shown in FIG. 1. The tangential blowing speed is higher than that of the inlet main flow. The tangential blowing flow passes through the fan rotor into the fan by-pass flow. The quiet air supply system in FIG. 1 is compacted and streamlined for the air worthiness of the inlet application and otherwise has all the main features as shown in FIG. 2. The air source to the tangential blowing flow is intentionally not specified and could be from an onboard air source such as from the auxiliary power unit.

Figure 11A:
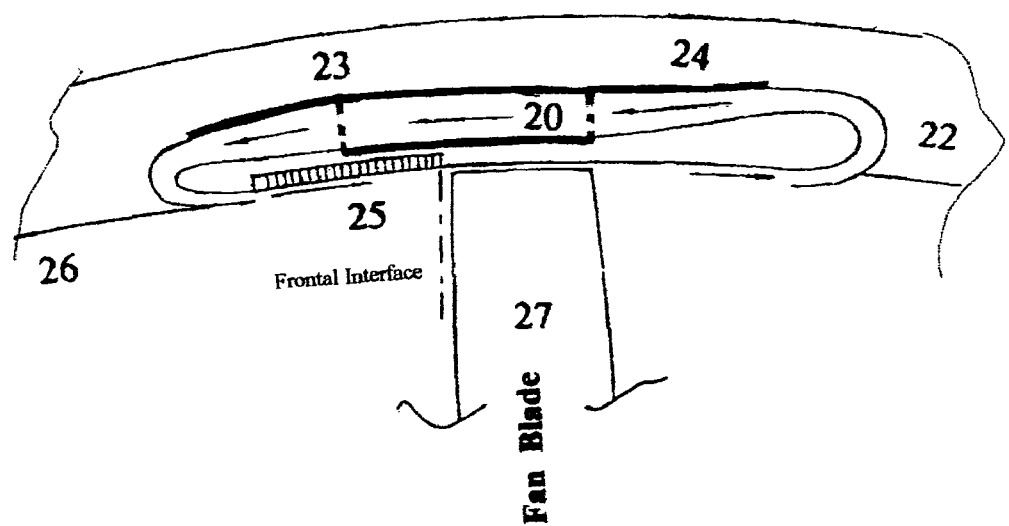
FIGS. 11*a* and 11*b* show an embodiment of a simple tangential blowing inlet with a fan bleed air source and compressor air bleed source.

FIG. 11*a* shows a situation when the supply air can be extracted from the fan flow behind the fan rotor. This parasitic recirculation of the tangential blowing flow is contained within the nacelle cowling.

Forward looking, when the fan bleed parasitic recirculation flow is continuously activated during the entire airplane trip, future aviation engine fan design can be optimized with this fan bleed recirculation flow in mind.

Figure 11B:
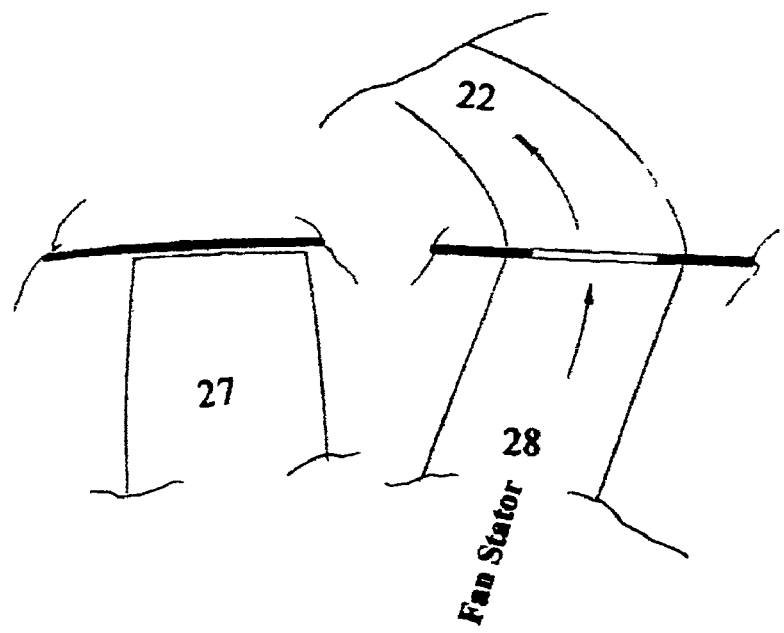

The air source can also be from the engine low pressure compressor bleed. This bleed flow can be ducted through the hollow fan stator vanes across the channel of the fan by-pass flow (FIG. 11*b*).

Low frequency buzz saw noise emitted from the inlet can conveniently find its way into the aircraft cabins; to alleviate the cabin noise speech interference and to improve passenger comfort, the buzz saw noise control recirculation air flow can be activated during the entire journey of the fight.

Figure 12:
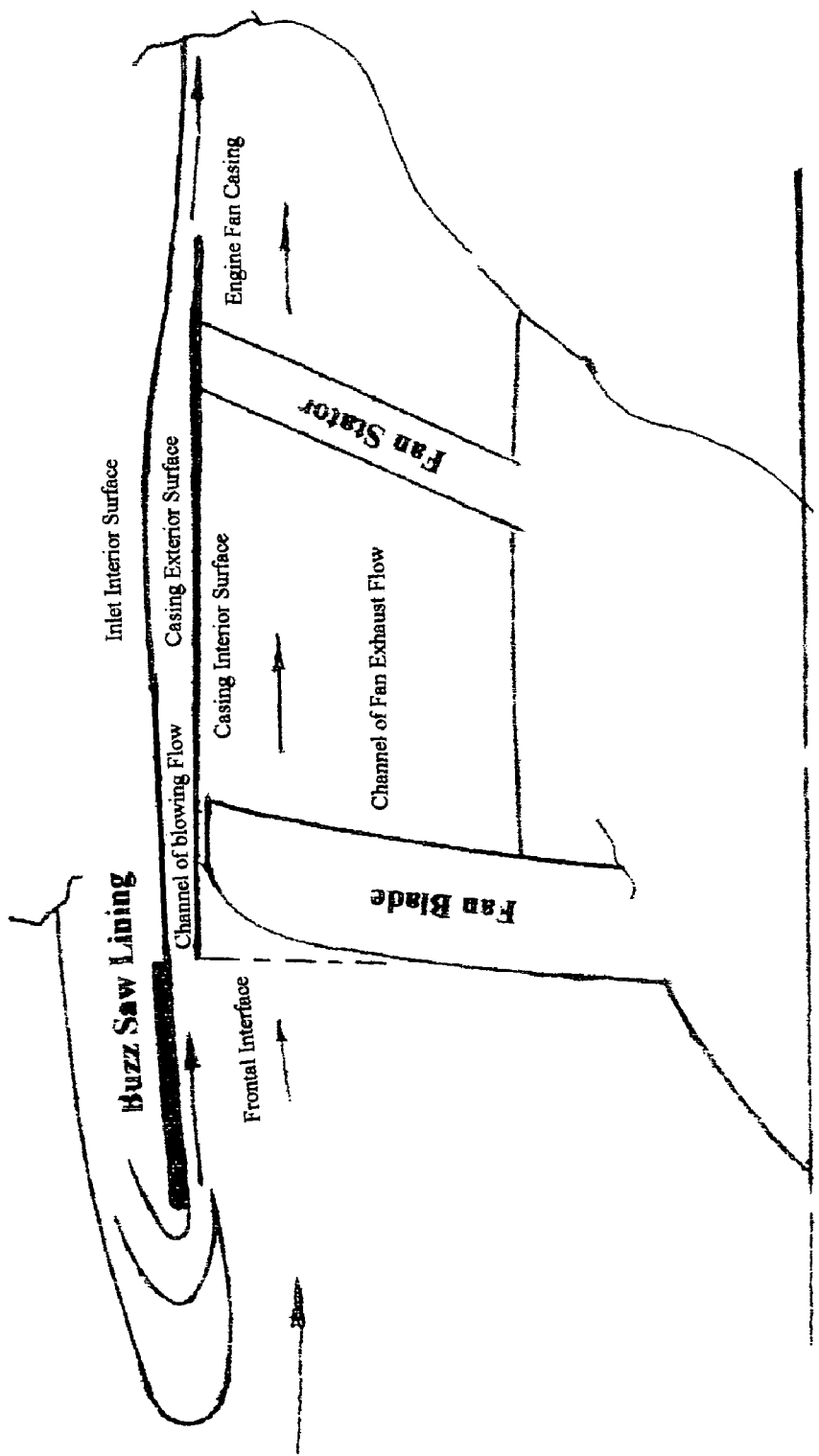
FIG. 12 shows an embodiment of an inlet with blowing flow at even higher speeds.

A first variation of the tangential blowing inlet is shown in FIG. 12 for even higher blowing flow speeds. The inlet interior surface diameter is larger than that of the engine fan casing; the channel between the inlet interior surface and the fan casing outer surface takes a majority of the blowing flow. The blowing flow is then ducted back into the engine fan flow.

Figure 13:
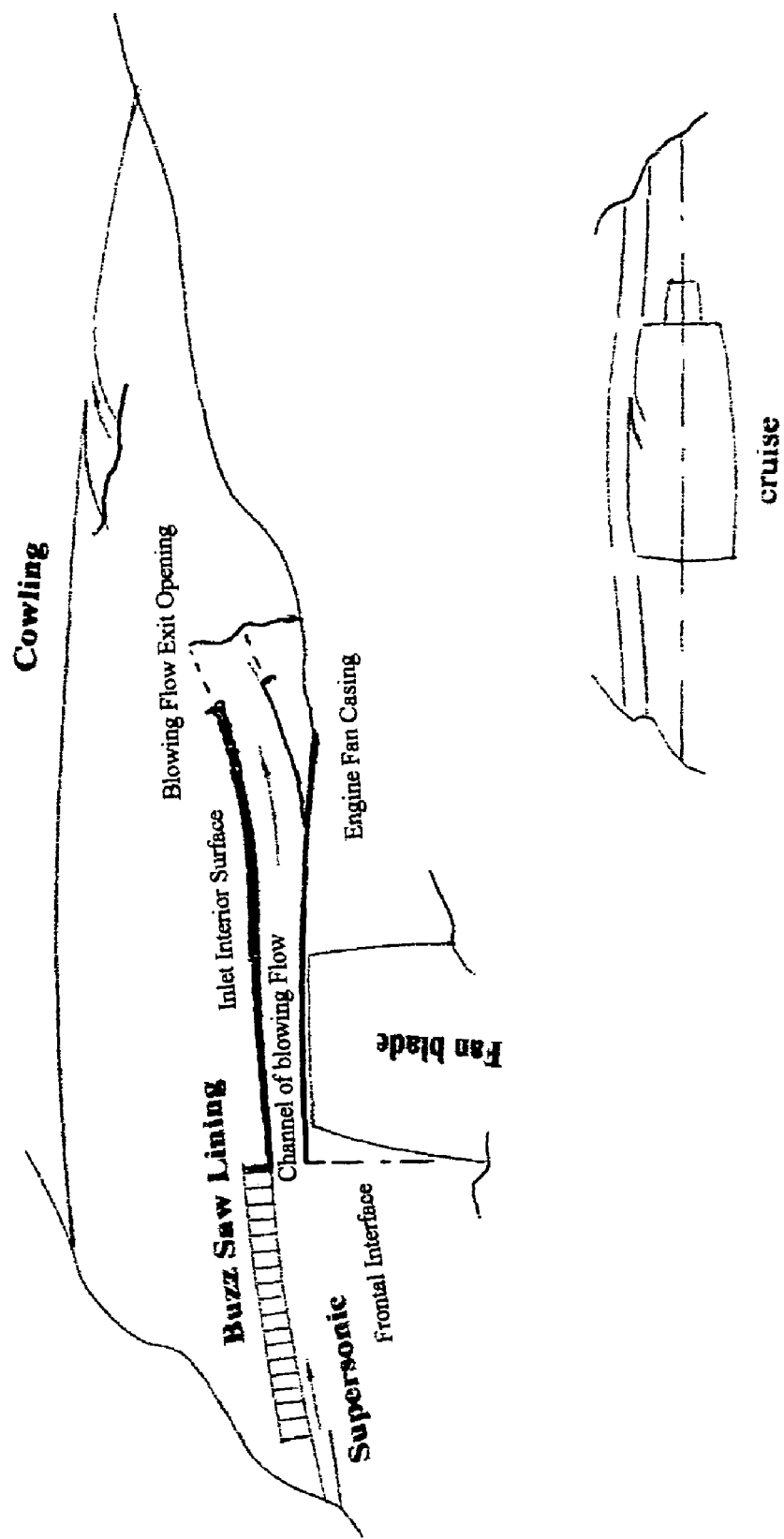
FIG. 13 shows an embodiment of an inlet with blowing flow at supersonic speed.

A second variation of the tangential blowing inlet is shown in FIG. 13 for supersonic blowing speeds. The annular tangential blowing slot is convergent-divergent. The inlet interior surface diameter is comparatively larger than that for the first variation. The channel between the inlet interior surface and the fan casing outer surface is also large with the channel takes most of the blowing flows. The blowing airflow can be ducted back into the engine fan flow, or it can be ducted to the cowling surface for cowling outer surface boundary layer control.

Figure 15:
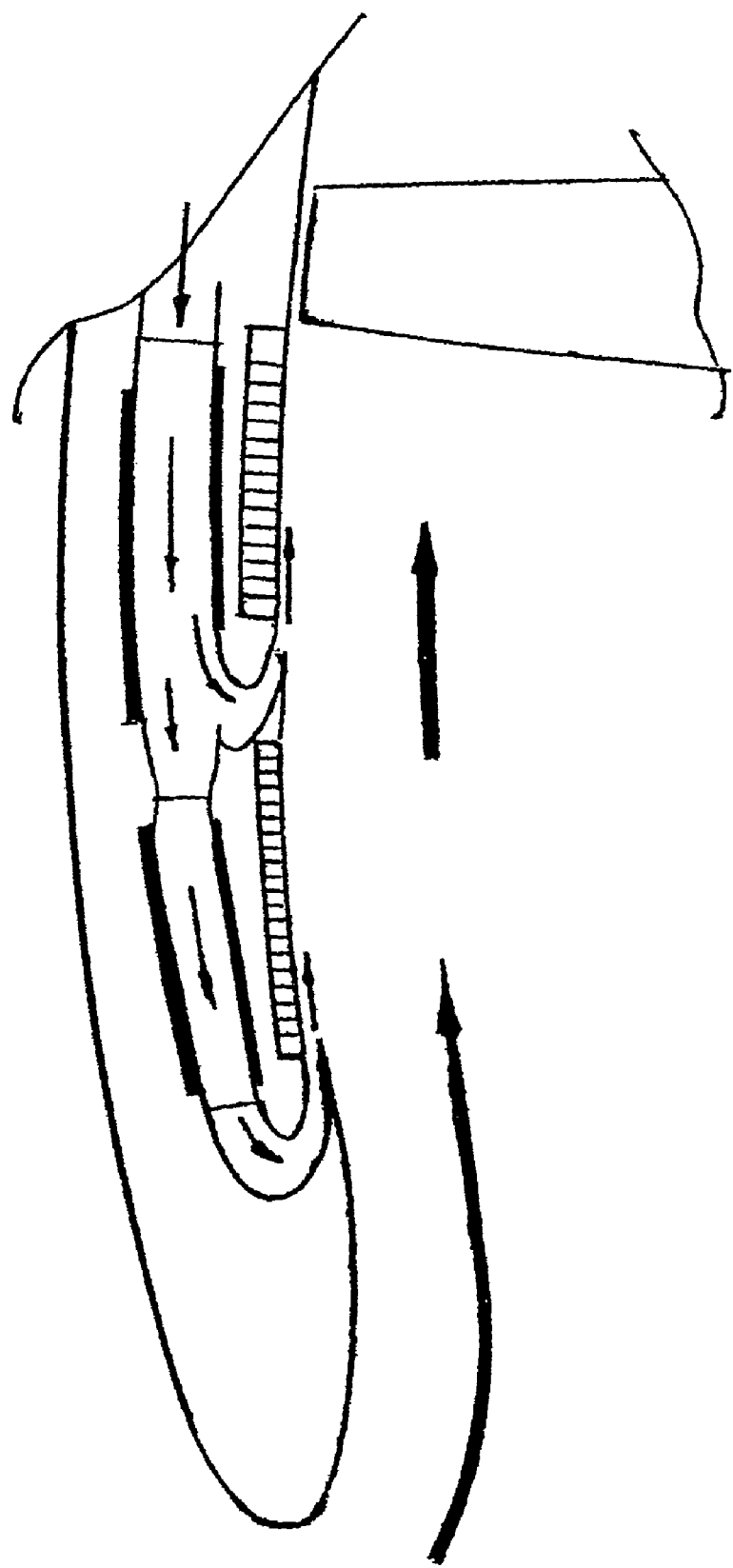
FIG. 15 shows an embodiment of an inlet with multiple tangential blowing slots and multiple segments of acoustic linings.

A broader application of the tangential blowing inlet is shown in FIG. 15 as a dual blowing dual acoustic lining inlet. The first blowing slot is an annular tangential blowing slot with a downstream facing inlet lip; the second blowing slot is an annular tangential blowing slot with an inlet lip flush with the inlet interior surface. The acoustic linings are tuned respectively at frequencies higher, equal, or lower than the fan, blade passing frequency. The blowing flow speed is higher than that of the inlet main flow. And the inlet interior surface is the extension upstream of the engine fan casing.

With the availability of the tangential blowing airflow as depicted in the above embodiments, the inlet and nacelle can be reshaped and redesigned from the beginning to minimize its cruise drag and to reduce the trip fuel consumption. See FIG. 13.

Aerodynamically, the tangential blowing airflow is a strong boundary layer control blowing airflow which can also prevent inlet boundary layer separation caused by cross wind or high angle of attack of inlet inflow.

FIG. 2 is a manufacturing drawing of a model inlet, the features and layout show a blowing slot 21 which is annular, extending axial symmetrically 360 degrees in the circumferential direction all the way around the inlet axis, and having a slot lip in the shape of a downstream facing step. The sole purpose of the said blowing device is to produce a stream of flow, with circumferential uniformity, tangential to a surface on which the flow grazes. The physics of the flow situation described above is defined as tangential blowing. The annular geometry above can be unwrapped into a two-dimension geometry as in the past researches.

An experimental program using the said model inlet, FIG. 2, in connection with a model fan was carried out in a multi-year test program. The scope of the experiment involves buzz saw linings, 25; a removable hard wall section, 29 to vary the relative positions between the slot and the lining; a quiet air supply system 20, including acoustic treatment, 24, perforated plate, 23 to ensure low self noise of the blowing air; and a replacement solid step in the position of the blowing slot to simulate flow separation bubble and thick boundary layers. The annular tangential blowing slot is shown in FIG. 3. A tangential flow situation is shown in FIG. 5 indicating new boundary layer development and flow mixing processes with no flow separation bubble. The buzz saw linings tested are of perforated-face-sheet-honeycomb-core-back-plate construction, FIG. 10. A laboratory test layout is shown in FIG. 14. The test model inlet was placed in an anechoic chamber. Far field noise was measured by a microphone mounted on a boom, which swept on an arc in the front hemisphere of the inlet.

Typical frontal noise contours are shown in FIG. 14 with and without the activation of the blowing flow indicating the lining attenuation improvement and the attenuation directivity. More than 2000 test data points were accumulated.

Tangential blowing has been born out in the experimentation to be critical; should blowing at an angle be the situation such that local flow separation bubble is induced (FIG. 6), the noise attenuation performance of the linings, no matter optimized or not, would be worse than if there were no blowing. Blowing the wrong way can hurt.

The importance of the quiet air supply system cannot be overstated. High self-noise of the air supply can ruin the experiment. For example, air supply from the fan exhaust flow without an acoustically treated air supply system will render the experiment compromised, because self noise of air from the fan exhaust is high and the hard wall air supply system is a very good acoustic conduit.

A CD was submitted to PTO in connection with reference patent application Ser. No. 11/455,301. The CD discloses two test data points. Play back of the CD will experience the audio evidence of the unexpected effect of tangential blowing on inlet buzz saw noise abatement improvement. A copy of the CD will be submitted in connection with the present patent application if called for.

To facilitate developmental experimentation, the following values of the key design parameters are suggested, where D is the aviation engine fan diameter. It is understood that the design parameters are not limited by the following values.

| Tangential blowing slot: | |
|---|---|
| Slot height, h h/D | 0.01 to 0.02 |
| Buzz saw lining: | |
| Lining length, l l/D | 0.2 to 0.3 |
| Perforated face sheet percent open area | 20% to 30% |
| Honeycomb core depth, d d/D | 0.015 to 0.03 |

REFERENCES

"Quiet Technology Demonstrator 2 Inlet Liner Design and Validation". Jia Yu, 12$^{th}$ AIAA/CEAS Aeroacoustics Conference, AIAA-2006-2458.

"Experimental Investigation of the HQ-Liner Concept on a Scale Simulation Turbo-Fan Rig", Jose Alonso, 11$^{th}$ AIAA/CEAS Aero acoustics Conference, AIAA-2005-3070.

EVNERT Program "Testing of Adaptive HQ-Liner for afte noise Control Alonos, Jose S. AIAA 2008-2811 14$^{th}$ AIAAJCEAS Aeroacoustic Conference May, 2008

"Detailed Analysis of the Virtual Scarf Inlet (VSI)", Diminik Broszat, 14$^{th}$ AIAA/CEAS Aeroacoustics Conference, AIAA-2008-2980.

"Flow in Transonic Compressors", Jack I. Kerrebrock, AIAA Journal, VOL. 19, NO. 1 January, 1980

"Calculation of Turbulent Boundary Layer and Wall Jets Over Curved Surfaces" F. A. Dvorak, AIAA Journal, VOL. 11, NO. 4,April 1973

PATENT REFERENCE

Tuan, Patent NO. 7967105, filing date Jun. 19, 2006, "Aero acoustic aviation inlet for Aggressive noise Abatement"

Tuan, Provisional application No. 61/400,697, filing date Aug. 2, 2010, "Gaseous-fluid supply system for Noise Abatement application"

I claim:

1. An inlet for an aviation engine comprising:
    an exterior surface of the inlet extending a full length of the inlet and extending further downstream to form a nacelle cowling;
    a lip surface of the inlet;
    an interior surface of the inlet extending the full length of the inlet from the lip surface to a frontal interface of the aviation engine;
    a segment of a buzz saw lining immediately connected to the frontal interface of the aviation engine, and having an exposed surface defining a portion of the interior surface of the inlet;
    an annular tangential blowing slot positioned immediately upstream from the segment of the buzz saw lining and extending circumferentially 360 degrees around the interior surface of the inlet, blowing a flow of air at speeds greater than a mean speed of a flow of air of the inlet, with a source of the blowing air from a bleed of air flow of a fan of the aviation engine;
    Wherein in the segment of the buzz saw lining and the annular tangential blowing slot, whereby an improvement of attenuation of a buzz saw tone noise, comprising blowing the flow of air along a full length of a surface of the segment of the buzz saw lining, wherein the blowing of the flow of air at flow speeds greater than the mean speed of the flow of air of the inlet.

2. The inlet for the aviation engine of claim 1, wherein the annular tangential blowing slot has a lip in a shape of a downstream facing step.

3. The inlet for the aviation engine of claim 1, wherein the exterior surface of the inlet, the lip surface of the inlet, the interior surface of the inlet, the nacelle cowling and the annular tangential blowing slot, whereby an improvement of cruise drag and fuel consumption of an airplane, comprising redesigning and reshaping the nacelle cowling.

4. The inlet for the aviation engine of claim 1, wherein the annular tangential blowing slot is flush with the interior surface of the inlet.

5. The inlet for the aviation engine of claim 1, wherein the blowing air flow of the annular tangential blowing slot is activated through an entire time of a journey of an aircraft to control an aircraft cabin noise level for passenger comfort.

6. The inlet for the aviation engine of claim 1, wherein the segment of the buzz saw lining has a length of 0.2 to 0.3 times a diameter of the fan of the aviation engine.

7. The inlet for the aviation engine of claim 1, wherein the segment of the buzz saw lining is constructed using a perforated-face-sheet-honeycomb-core-back-plate sandwich.

8. An inlet for an aviation engine comprising:
an exterior surface of the inlet extending a full length of the inlet and extending further downstream to form a nacelle cowling;
a lip surface of the inlet;
an interior surface of the inlet extending the full length of the inlet from the lip surface to a frontal interface of the aviation engine and extending further downstream with a diameter of the interior surface larger than a diameter of a fan casing of the engine for a blowing flow of air to pass;
an annular channel of the blowing flow of air between the interior surface of the inlet and an exterior surface of the fan casing, extending downstream for the annular channel of the flow of air to merge with a channel of a fan exhaust flow;
a segment of a buzz saw lining immediately connected to the frontal interface of the aviation engine; and having an exposed surface defining a portion of the interior surface of the inlet;
an annular tangential blowing slot positioned immediately upstream from the segment of the buzz saw lining and extending circumferentially 360 degrees around the interior surface of the inlet, blowing the flow of air at speeds greater than a mean speed of a flow of air of the inlet with a source of the blowing air from a bleed of air of a low pressure compressor of the aviation engine;
wherein in the segment of the buzz saw lining and the annular tangential blowing slot, whereby an improvement of attenuation of a buzz saw tone noise, comprising blowing the flow of air along a full length of a surface of the segment of the buzz saw lining, wherein the blowing of the flow of air at flow speeds greater than the mean speed of the flow of air of the inlet.

9. The inlet for the aviation engine of claim 8, wherein the annular tangential blowing slot has a lip in a shape of a downstream facing step.

10. The inlet for the aviation engine of claim 8, wherein the exterior surface of the inlet, the lip surface of the inlet, the interior surface of the inlet, the nacelle cowling and the annular tangential blowing slot, whereby an improvement of cruise drag and fuel consumption of an airplane, comprising redesigning and reshaping the nacelle cowling.

11. The inlet for the aviation engine of claim 8, wherein the annular tangential blowing slot is flush with the interior surface of the inlet.

12. The inlet for the aviation engine of claim 8, wherein the blowing air flow of the annular tangential blowing slot is activated through an entire time of a journey of an aircraft to control an aircraft cabin noise level for passenger comfort.

13. The inlet for the aviation engine of claim 8, wherein the segment of the buzz saw lining has a length of 0.2 to 0.3 times the diameter of the fan casing of the aviation engine.

14. The inlet for the aviation engine of claim 8, wherein the segment of the buzz saw lining is constructed using a perforated-face-sheet-honeycomb-core-back-plate sandwich.

15. An inlet for an aviation engine comprising:
an exterior surface of the inlet extending a full length of the inlet and extending further downstream to form a nacelle cowling;
a lip surface of the inlet;
an interior surface of the inlet extending the full length of the inlet from the lip surface to a frontal interface of the aviation engine;
an annular channel of a blowing flow of air between an extension of the interior surface of the inlet downstream from the frontal interface of the aviation engine and an exterior surface of a fan casing, eventually in a downstream direction forming an exit opening of the blowing flow of air;
a segment of a buzz saw lining immediately connected to the frontal interface of the aviation engine and having an exposed surface defining a portion of the interior surface of the inlet;
an annular tangential blowing slot positioned immediately upstream from the segment of the buzz saw lining and extending circumferentially 360 degrees around the interior surface of the inlet, having the blowing a flow of air at speeds greater than a mean speed of a flow of air of the inlet, with a source of the blowing flow of air from a bleed of a flow of air of a low pressure compressor of the aviation engine;
wherein in the segment of the buzz saw lining and the annular tangential blowing slot, whereby an improvement of attenuation of a buzz saw tone noise, comprising blowing the flow of air along a full length of a surface of the segment of the buzz saw lining, wherein the blowing flow of air at supersonic flow speeds greater than the mean speed of the flow of air of the inlet.

16. The inlet for the aviation engine of claim 15, wherein the annular tangential blowing slot has a lip in a shape of a downstream facing step.

17. The inlet for the aviation engine of claim 15, wherein the annular tangential blowing slot is flush with the interior surface of the inlet.

18. The inlet for the aviation engine of claim 15, wherein the blowing air flow of the annular tangential blowing slot is activated through an entire time of a journey of an aircraft to control an aircraft cabin noise level for passenger comfort.

19. The inlet for the aviation engine of claim 15, wherein the segment of the buzz saw lining has a length of 0.2 to 0.3 times a diameter of the fan of the aviation engine.

20. The inlet for the aviation engine of claim 15, wherein the segment of the buzz saw lining is constructed using a perforated-face-sheet-honeycomb-core-back-plate sandwich.

21. The inlet for the aviation engine of claim 15, wherein the exterior surface of the inlet, the lip surface of the inlet, the interior surface of the inlet, the nacelle cowling and the annular tangential blowing slot, whereby an improvement of cruise drag and fuel consumption of an airplane, comprising redesigning and reshaping the nacelle cowling.

* * * * *